United States Patent
Schrock

(10) Patent No.: US 8,776,456 B1
(45) Date of Patent: Jul. 15, 2014

(54) SOLAR PANEL TILE ROOF MOUNTING DEVICE

(71) Applicant: Sunmodo Corporation, Vancouver, WA (US)

(72) Inventor: Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 14/059,435

(22) Filed: Oct. 21, 2013

(51) Int. Cl.
*E04D 13/18* (2014.01)
*F24J 2/52* (2006.01)
*E04D 1/36* (2006.01)

(52) U.S. Cl.
CPC *F24J 2/5245* (2013.01); *E04D 1/36* (2013.01)
USPC ............ 52/173.3; 52/543; 403/258; 403/394; 403/400; 126/623

(58) Field of Classification Search
CPC ......... F24J 2/5203; F24J 2/523; F24J 2/5245; F24J 2/5258; Y02E 10/47; Y02B 10/20; H01L 31/0482; E04D 13/1407
USPC .............. 52/173.3, 543, 544, 173.1; 403/256, 403/258, 262, 264, 373, 394, 346, 400; 136/244; 126/623
See application file for complete search history.

(56) References Cited

U.S. PATENT DOCUMENTS

| | | | | |
|---|---|---|---|---|
| 446,282 A | * | 2/1891 | Bush | 238/290 |
| 1,224,426 A | * | 5/1917 | Steele | 238/367 |
| 2,288,439 A | * | 6/1942 | Dahm | 248/547 |
| 3,809,346 A | * | 5/1974 | Jackson | 248/530 |
| 4,581,863 A | * | 4/1986 | Thaler | 52/126.2 |
| 4,795,294 A | * | 1/1989 | Takada et al. | 411/457 |
| 4,965,971 A | * | 10/1990 | Jean-Jacques et al. | 52/199 |

(Continued)

FOREIGN PATENT DOCUMENTS

AT 12142008 A1 6/2011
DE 29521650 U1 3/1998

(Continued)

OTHER PUBLICATIONS

RoofTrac PV Mounting System Installation Manual, Sep. 13, 2004, pp. 1-11, Professional Solar Products, Camarillo, CA.

(Continued)

*Primary Examiner* — William Gilbert
*Assistant Examiner* — James Ference
(74) *Attorney, Agent, or Firm* — Stone Creek Services LLC; Alan M Flum

(57) ABSTRACT

Disclosed is a device for mounting solar panels and other equipment to tile roofs, or similar roof structures, that does not require removal of roofing tile for installation. A stanchion is inserted into a hole drilled into a roofing tile. Two or more wood securing fasteners are inserted into diagonal and crossing through-holes in the sides of the stanchion above the tile and exit on opposing sides of the stanchion, with respect to their insertion point, below the tile. The ends of the wood securing fasteners engage the surface of the roof sheeting beneath the tile at a distance outwardly away from the stanchion. With this arrangement, the tile roof equipment-mounting device engages the roof surface over a wider area than the diameter of the hole drilled into the roof tile without the need for removing the roof tile.

10 Claims, 15 Drawing Sheets

(56) References Cited

U.S. PATENT DOCUMENTS

| | | | |
|---|---|---|---|
| 5,010,700 A * | 4/1991 | Blair | 52/199 |
| 5,039,256 A * | 8/1991 | Gagliano | 405/244 |
| 5,226,263 A * | 7/1993 | Merrin et al. | 52/58 |
| 5,346,169 A * | 9/1994 | Polonsky | 248/547 |
| 5,515,658 A * | 5/1996 | Jorde | 52/215 |
| 5,603,187 A * | 2/1997 | Merrin et al. | 52/58 |
| 5,625,983 A | 5/1997 | Lachance et al. | |
| 5,842,685 A | 12/1998 | Purvis et al. | |
| 6,360,491 B1 * | 3/2002 | Ullman | 52/22 |
| 6,640,503 B1 | 11/2003 | Evensen et al. | |
| 6,910,832 B2 * | 6/2005 | Gagliano et al. | 405/231 |
| 7,260,918 B2 * | 8/2007 | Liebendorfer | 52/173.3 |
| 7,290,743 B2 * | 11/2007 | Nowack | 248/216.1 |
| 7,326,003 B2 * | 2/2008 | Gagliano | 405/229 |
| 7,758,011 B2 * | 7/2010 | Haddock | 248/500 |
| 7,762,027 B1 * | 7/2010 | Wentworth et al. | 52/173.3 |
| 7,766,292 B2 * | 8/2010 | Liebendorfer | 248/237 |
| 7,797,883 B2 | 9/2010 | Tarbell et al. | |
| 7,861,485 B1 | 1/2011 | Wentworth et al. | |
| 7,905,064 B1 * | 3/2011 | Wentworth et al. | 52/173.3 |
| 7,972,363 B2 * | 7/2011 | Moskowitz et al. | 606/246 |
| 8,122,648 B1 * | 2/2012 | Liu | 52/58 |
| 8,136,311 B2 * | 3/2012 | Liu | 52/173.3 |
| 8,177,180 B2 | 5/2012 | Plaisted et al. | |
| 8,250,829 B2 * | 8/2012 | McPheeters et al. | 52/710 |
| 8,448,405 B2 | 5/2013 | Schaefer et al. | |
| 8,448,407 B1 | 5/2013 | Wiener | |
| 2003/0024171 A1 | 2/2003 | Kao | |
| 2003/0101662 A1 * | 6/2003 | Ullman | 52/27 |
| 2003/0177706 A1 * | 9/2003 | Ullman | 52/3 |
| 2005/0175403 A1 * | 8/2005 | Herb et al. | 403/346 |
| 2007/0266672 A1 * | 11/2007 | Bateman et al. | 52/747.1 |
| 2008/0000173 A1 * | 1/2008 | Lenox et al. | 52/173.1 |
| 2008/0087275 A1 * | 4/2008 | Sade et al. | 126/623 |
| 2008/0121273 A1 * | 5/2008 | Plaisted et al. | 136/251 |
| 2009/0019796 A1 * | 1/2009 | Liebendorfer | 52/173.3 |
| 2009/0025314 A1 * | 1/2009 | Komamine et al. | 52/173.3 |
| 2010/0132274 A1 | 6/2010 | Reyal et al. | |
| 2010/0170163 A1 | 7/2010 | Tarbell et al. | |
| 2010/0192505 A1 * | 8/2010 | Schaefer et al. | 52/653.2 |
| 2010/0243023 A1 * | 9/2010 | Patton et al. | 136/244 |
| 2010/0281793 A1 * | 11/2010 | McPheeters et al. | 52/173.1 |
| 2010/0307074 A1 * | 12/2010 | Stearns et al. | 52/173.1 |
| 2011/0120047 A1 * | 5/2011 | Stearns et al. | 52/698 |
| 2011/0174947 A1 * | 7/2011 | Wu | 248/226.11 |
| 2011/0179727 A1 * | 7/2011 | Liu | 52/173.3 |
| 2011/0232222 A1 * | 9/2011 | McPheeters et al. | 52/698 |
| 2011/0247279 A1 * | 10/2011 | Stearns et al. | 52/58 |
| 2011/0247295 A1 * | 10/2011 | Stearns et al. | 52/745.21 |
| 2011/0302857 A1 * | 12/2011 | McClellan et al. | 52/173.3 |
| 2012/0073220 A1 * | 3/2012 | Kobayashi et al. | 52/173.3 |
| 2012/0102853 A1 * | 5/2012 | Rizzo | 52/173.3 |
| 2012/0175322 A1 * | 7/2012 | Park et al. | 211/41.1 |
| 2012/0330419 A1 * | 12/2012 | Moskowitz et al. | 623/17.16 |
| 2013/0009025 A1 | 1/2013 | Stearns | |
| 2013/0018470 A1 * | 1/2013 | Moskowitz et al. | 623/17.16 |
| 2013/0023992 A1 * | 1/2013 | Moskowitz et al. | 623/17.16 |
| 2013/0091787 A1 | 4/2013 | Puga | |

FOREIGN PATENT DOCUMENTS

| | | |
|---|---|---|
| EP | 1281821 B1 | 6/2010 |
| JP | 3581116 B2 | 10/2004 |
| JP | 2007016425 A | 1/2007 |
| JP | 2012112128 A | 6/2012 |
| JP | 4968969 B2 | 7/2012 |
| JP | 2013087587 A | 5/2013 |

OTHER PUBLICATIONS

Installation steps for both s-curve and flat curve tile, TileTrac, Apr. 27, 2011, Professional Solar Products, Camarillo, CA.

Speciality Flat Tile Mounting Instructions, May 2012, QuickMountPV, May 2012.

Nu-Mount Patent-Pending Racking System, HNU-Energy, Wailuku, Hi, accessed on the Internet at http://www.hnuenergy.com/download.html on Oct. 16, 2013.

Simpson Strong-Tie Wood Construction Connectors 2013-2014 C-2013, Nov. 2012, p. 22, Simpson Strong-Tie Company, Inc., Pleasanton, CA.

Unpublished U.S. Appl. No. 61/817,232, filed Apr. 29, 2013, Inventor: Clifford Barry Schrock, Applicant/Assignee: Sunmodo Corporation.

Unpublished U.S. Appl. No. 13/792,129, filed Mar. 10, 2013, Inventors: Jun Liu and Clifford Schrock, Applicant/Assignee: Sunmodo Corporation.

Unpublished U.S. Appl. No. 13/907,548, filed May 31, 2013, Inventors: Jun Liu and Clifford Schrock, Applicant/Assignee: Sunmodo Corporation.

* cited by examiner

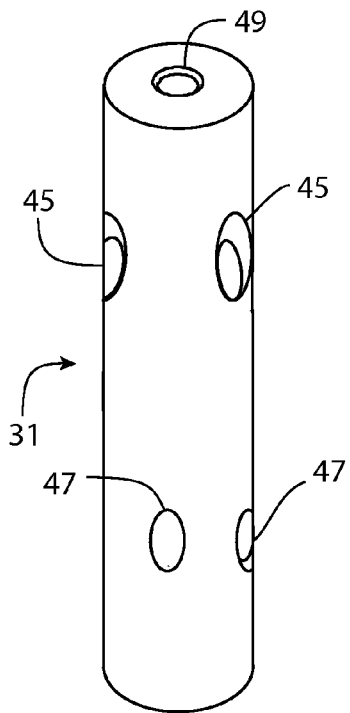
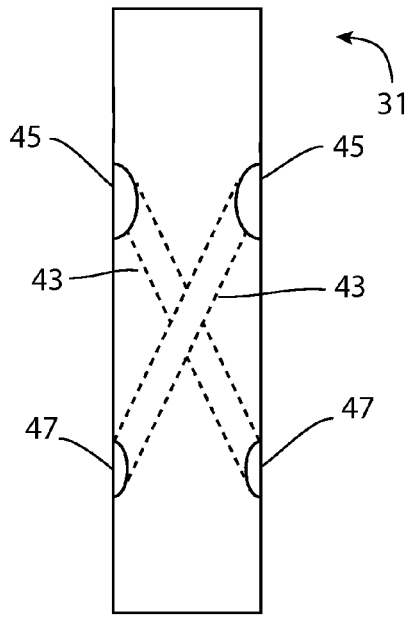
FIG. 12  FIG. 13
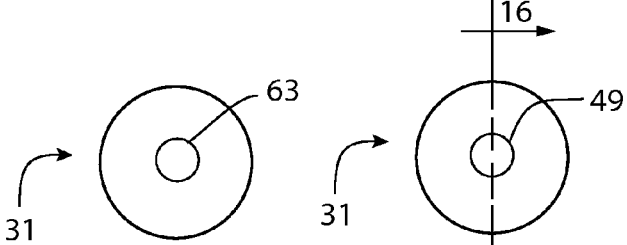
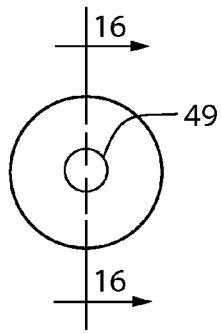
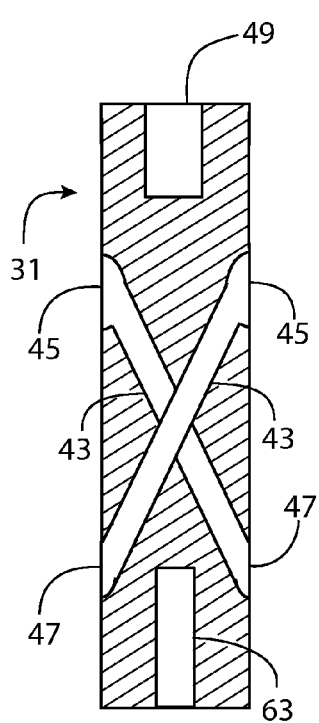
FIG. 14  FIG. 15  FIG. 16

SOLAR PANEL TILE ROOF MOUNTING DEVICE

BACKGROUND

The present disclosure relates to a device for mounting solar panels and other equipment to tile roofs and roof structures similar to tile roofs.

Mounting solar panels, such as solar photovoltaic (PV) panels or solar thermal panels, to tile roofs present its own particular set of challenges. Roof tile can be made of a variety of materials such as ceramic, slate, concrete, or clay. These materials can be brittle and therefore often do not present a stable mounting surface for solar panels or other roof mounted equipment. In addition, roof tiles come in a variety of different shapes and styles, for example, flat roof tile, or curved barrel tile. These variations in shape and style also present challenges for mounting equipment.

One solution has been to use a mounting device that includes a base portion in combination with a hook or bracket member. A portion of roof tile is removed to expose the roof-sheathing. The base portion engages and secures the mounting device to the exposed roof-sheathing directly. The hook or bracket member engages the equipment racking system to the mounting device. Flashing is generally placed on top of the base to prevent water infiltration. The removed tile portion is then re-secured over the base with an equipment-mounting portion at the end of bracket member exposed above the tile.

One of the challenges with this arrangement is the position of the base is often dictated by the rafters below the roof sheeting and therefore limits the position of roof equipment racking with respect to the mounting device. Another challenge is that one or more roof tiles must be removed or cut and then replaced. This requires additional installation labor and creates extra opportunity for roof leakage.

Another solution has been to drill a hole in one of the roof tiles, and engage the roof with a combination stanchion and wood securing fastener. The wood securing threaded stud extends vertically downward from the bottom of the stanchion. While this solution has the advantage of simplicity as compared with the bracket/base member previously described, it may not engage the roof as securely, and the position of the stanchion still may be dictated by the position of the rafters below the roof sheeting.

SUMMARY

Disclosed is a device for mounting solar panels to tile roofs that attempts to overcome the problems described in the background section. The device does not require tiles to be removed from the roof. The device also has increased stability as compared with the combination stanchion and vertical wood securing fastener described in the Background section. The device increases stability by spreading the points of fastening on the surface of the roof over a wider area than the stanchion and vertical wood securing threaded stud alone.

The device for mounting solar panels to tile roofs includes a stanchion. The stanchion includes two or more diagonal through-holes that cross over each other within the stanchion; each diagonal through-hole terminates with a first aperture on the side of the stanchion on the opposing side of the stanchion. The stanchion is placed through an aperture in the tile. The mounting device may include a threaded stud extending vertically downward below the bottom surface of the stanchion that can be screwed into the roof surface below the tile. The portion of the stanchion with the first apertures is above the tile and the portion of the stanchion with the second apertures is below the tile. Wood securing fasteners are inserted into corresponding through-holes from the top of the tile. The first apertures are configured to seat the wood securing fasteners while the second through-holes are configured to pass through the ends of the wood securing fasteners. The ends of the wood securing fasteners engage roof sheeting beneath the tile at a distance from the stanchion determined by the angle of the through-hole and the position of the second aperture on the side of the stanchion from the roof surface.

After the wood securing fasteners secure the stanchion to the roof surface, a formable flashing with a self-contained rubber or otherwise elastomeric boot is slipped over the stanchion and under the overlapping tile row adjacent to the tile with the aperture to prevent water leakage through the mounting hole.

The stanchion can include a threaded aperture on its top surface for mounting solar panel racking system securing hardware; for example, an L-bracket or U-bracket for engaging a rail. Alternatively, the top surface of the stanchion can be configured to seat solar panels directly with the threaded aperture receiving a machine-threaded fastener and solar panel mounting clamp.

This Summary introduced a selection of concepts in simplified form for a device for mounting equipment to tile roofs. The device for mounting equipment to tile roofs is described in further detail in the Description. The Summary is not intended to identify essential features or limit the scope of the claimed subject matter.

DRAWINGS

FIG. 12 shows a perspective view of the stanchion.

FIG. 13 shows a side view of the stanchion.

FIG. 14 shows a bottom view of the stanchion.

FIG. 15 shows a top view of the stanchion

FIG. 16 shows a sectional view of the stanchion taken along section line 16-16 of FIG. 15.

DESCRIPTION

Figure 1:
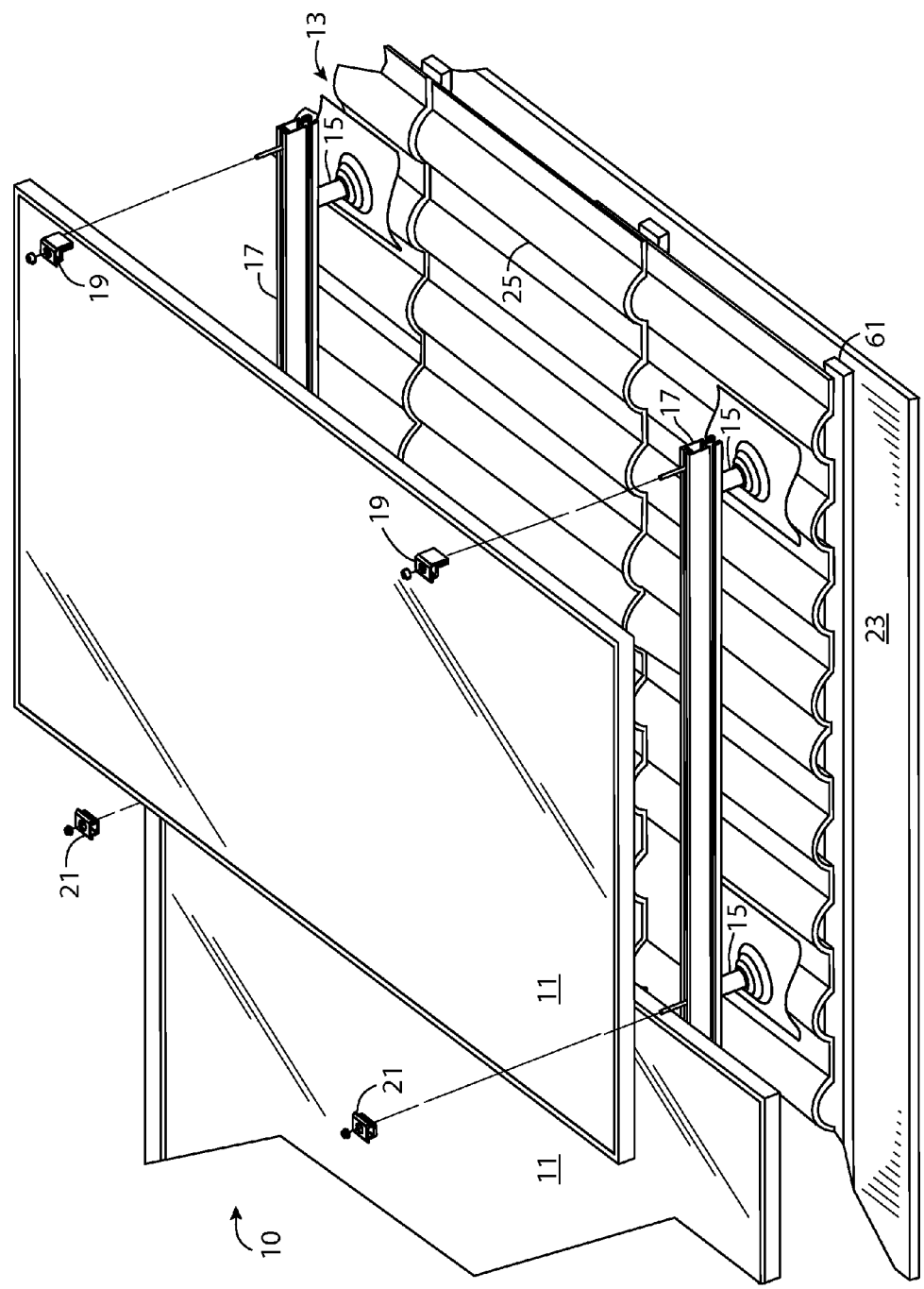
FIG. 1 shows a solar panel racking system including a mounting device.
Figure 2:
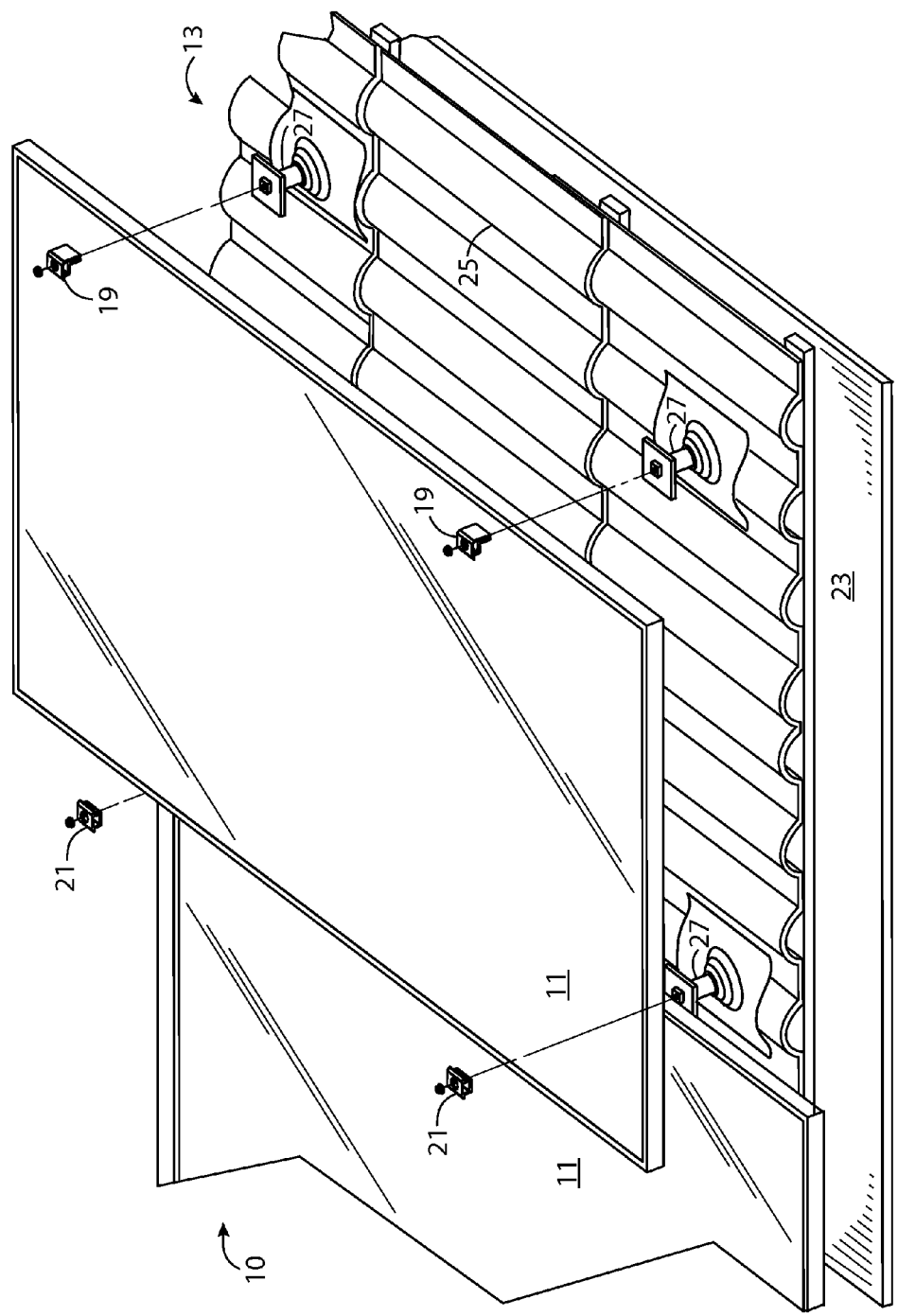
FIG. 2 shows a solar panel racking system including a mounting device configured to mount solar panels without rails.

The following description is made with reference to figures, where like numerals refer to like elements throughout the several views, FIGS. 1-2 shows, in partially exploded perspective view, a solar panel system and tile roof structure 10 with solar panels 11 mounted to a tile roof 13. In FIG. 1, the solar panels 11 are mounted to a rail 17 by solar panel end-clamps 19 and mid-clamps 21. The rails 17 are secured to a mounting device 15. The mounting device 15 is secured to roof-sheathing 23 underneath the roof tiles 25. In FIG. 2 the solar panels 11, solar panel end-clamps 19, and mid-clamps 21 are secured directly to an alternative mounting device 27 with a bolt, threaded rod and nut, or other fastener, without the need of the rails 17 of FIG. 1. The alternative mounting device 27 is secured to the roof-sheathing 23 of the tile roof 13 underneath the roof tiles 25.

Figure 3:
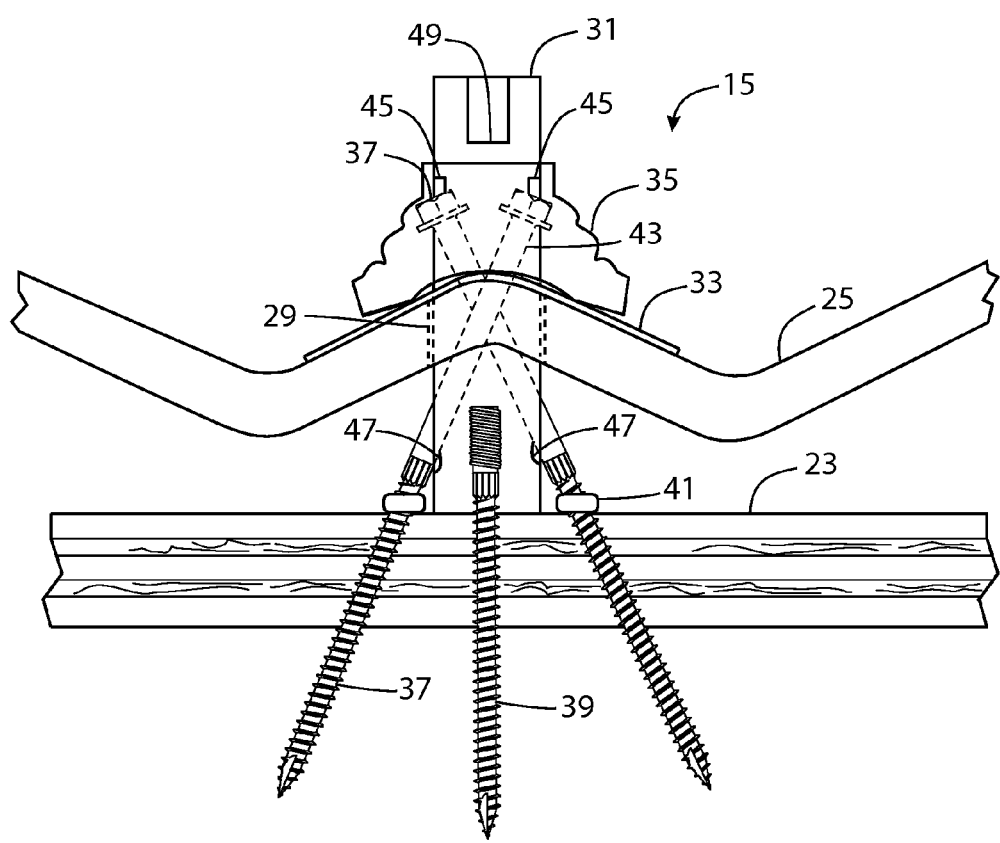
FIG. 3 shows a portion of FIG. 1, in side view, showing the mounting device mounted to roof-sheathing.

FIG. 3 shows a portion of FIG. 1, in side view, showing the mounting device 15 mounted through a tile aperture 29 in the roof tile 25 to roof-sheathing 23. The mounting device 15, as shown in FIG. 3, includes a stanchion 31, an elastomer gasket under the stanchion, a formed-flashing 33 with an integral elastomeric boot 35 for preventing water infiltration into the tile aperture 29, wood securing fasteners 37 and a wood securing threaded stud 39 for securing the stanchion 31 to the roof-sheathing 23. The wood securing fasteners 37 pass through elastomeric washers 41 that is compressed against the surface of the roof-sheathing 23 to further protect against water ingress as the wood securing fasteners 37 is screwed into the roof-sheathing 23. The wood securing fasteners 37 pass into diagonal through-holes 43 in the sides of the stanchion 31. The diagonal through-holes 43 cross over each other within the stanchion 31. Each diagonal through-holes 43 passes through the sides of the stanchion 31 forming a first aperture 45 above the tile and a second aperture 47 below the roof tile 25. The wood securing fasteners 37 engage the surface of the roof-sheathing 23 a distance away from the stanchion 31 determined by the combination of the angle of the diagonal through-hole 43 with respect to the stanchion 31 and the distance of the second aperture 47 from the bottom of the stanchion 31. This arrangement allows the mounting device to have a mounting area wider than the tile aperture 29 without removal of the roof tiles 25. The stanchion 31 can include a first threaded aperture 49 on its top surface for mounting solar panel racking system securing hardware; for example, an L-bracket or U-bracket for engaging a rail 17 of FIG. 1, or alternatively, a short bolt for engaging the rail 17 of FIG. 1 directly.

Figure 4:
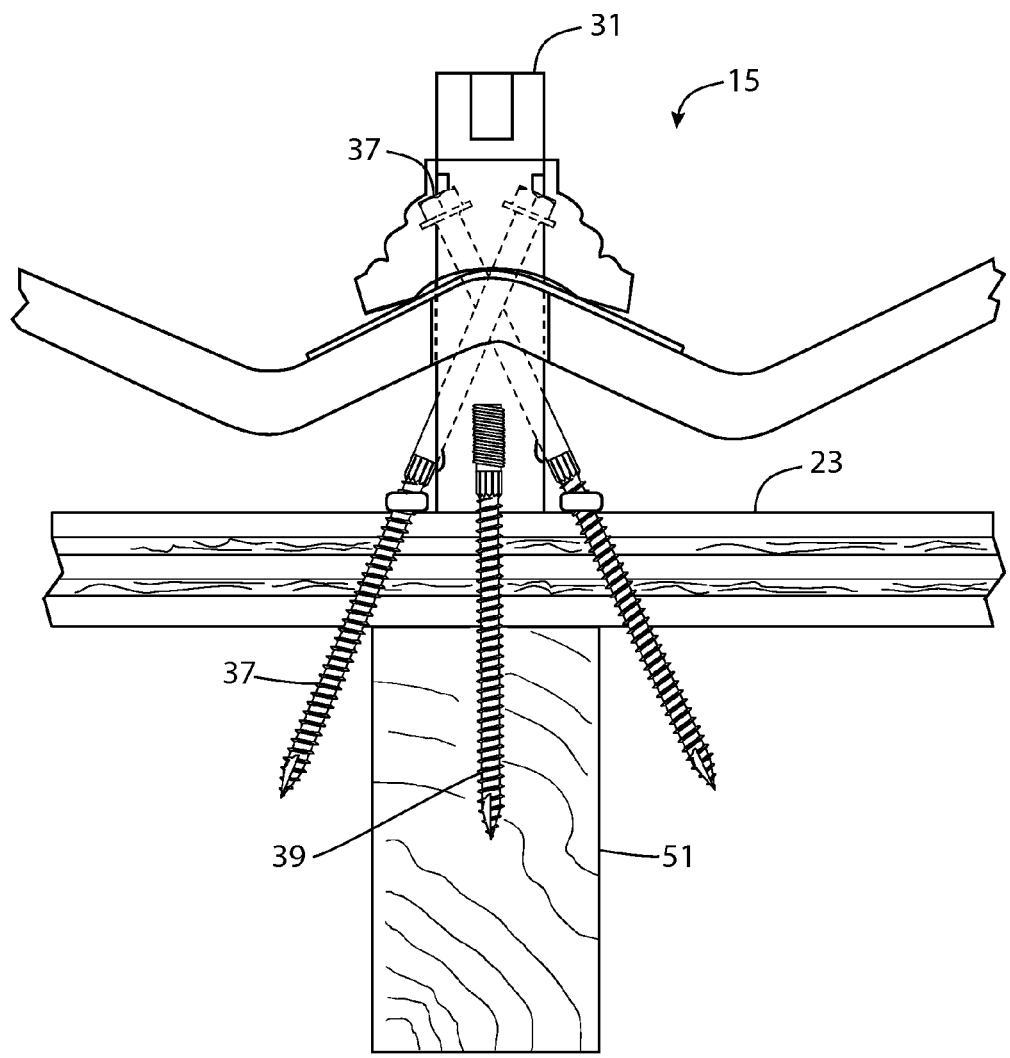
FIG. 4 shows a portion of FIG. 1, in side view, showing the mounting device mounted to both the roof-sheathing and roof rafters.

FIG. 4 shows a portion of FIG. 1, in side view, showing the stanchion 31 of the mounting device 15 secured by wood securing fasteners 37 to the roof-sheathing 23 and by the wood securing threaded stud 39 to a roof rafter 51. Securing the wood securing threaded stud 39 to the roof rafter 51 provides additional pull strength in addition to the shear strength provided by the wood securing fasteners 37 by outwardly and obliquely engaging the roof-sheathing 23 surface at a position beyond the circumference of the stanchion 31.

Figure 5:
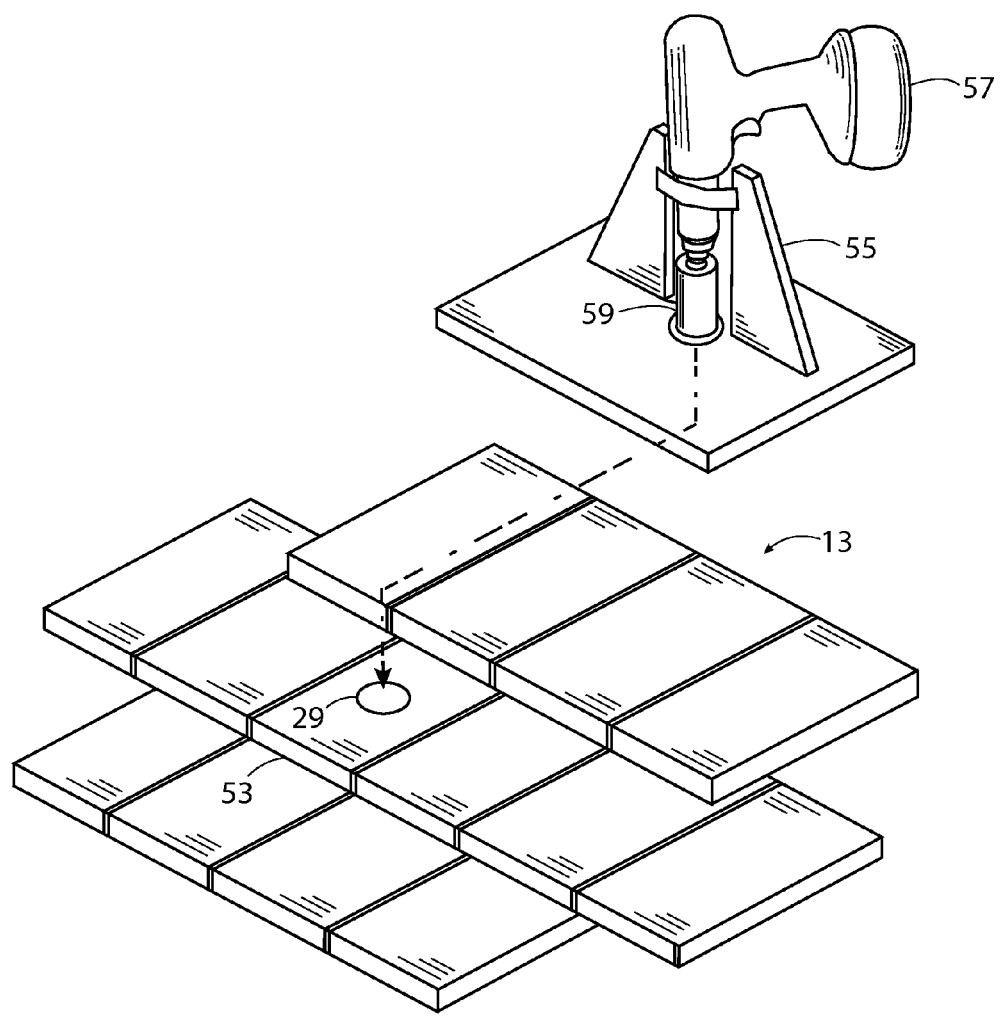
FIG. 5 shows a tile roof with a jig for drilling an aperture in the tile roof for mounting the stanchion.
Figure 6:
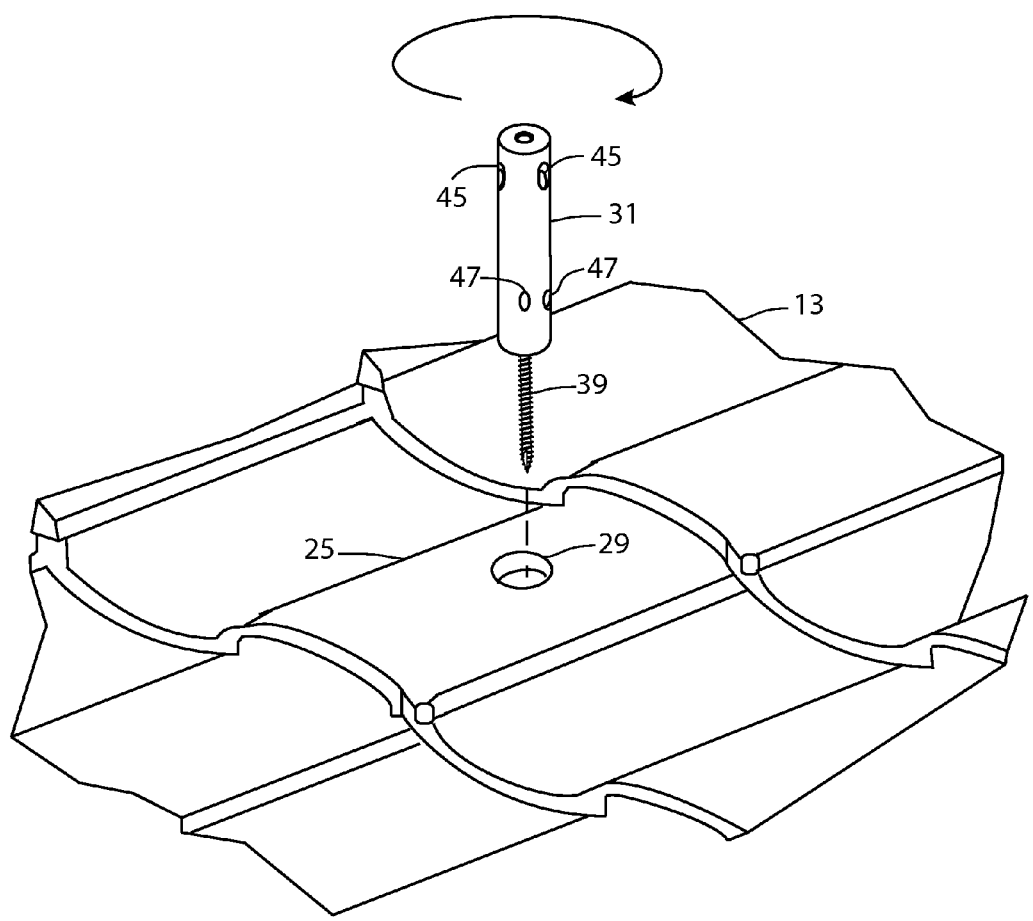
FIG. 6 shows the stanchion being inserted into the aperture drilled into the tile roof.
Figure 7:
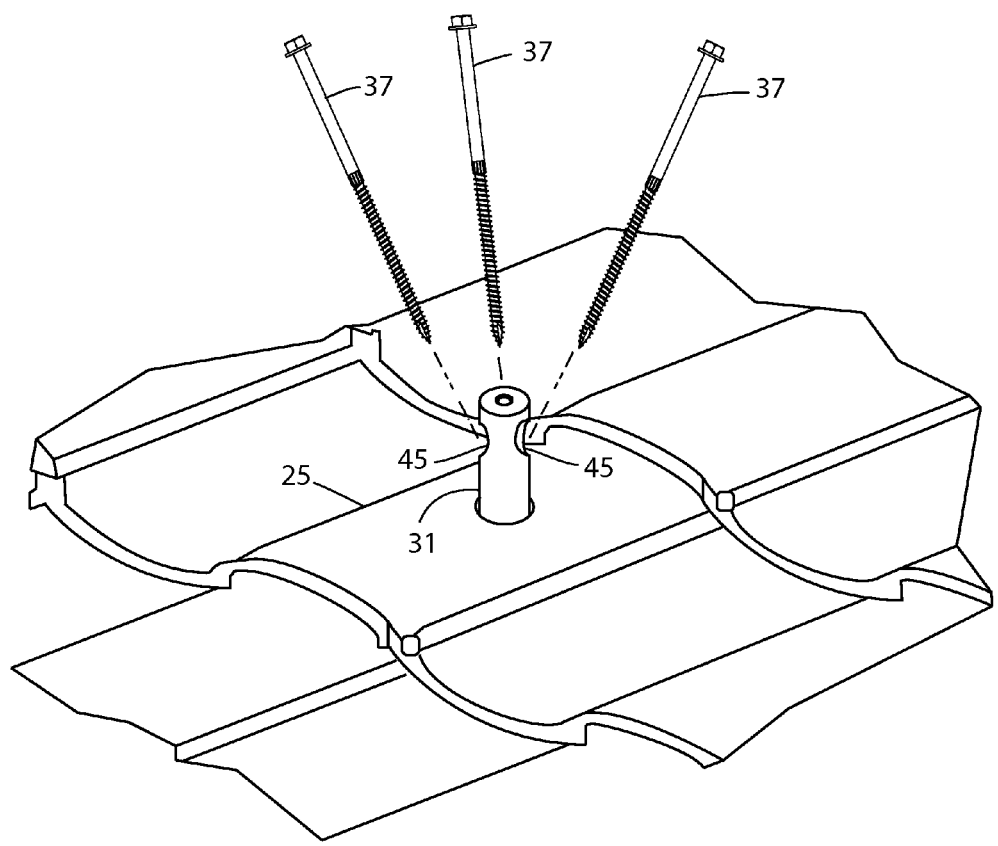
FIG. 7 shows the roof securing fasteners being inserted into the stanchion.
Figure 8:
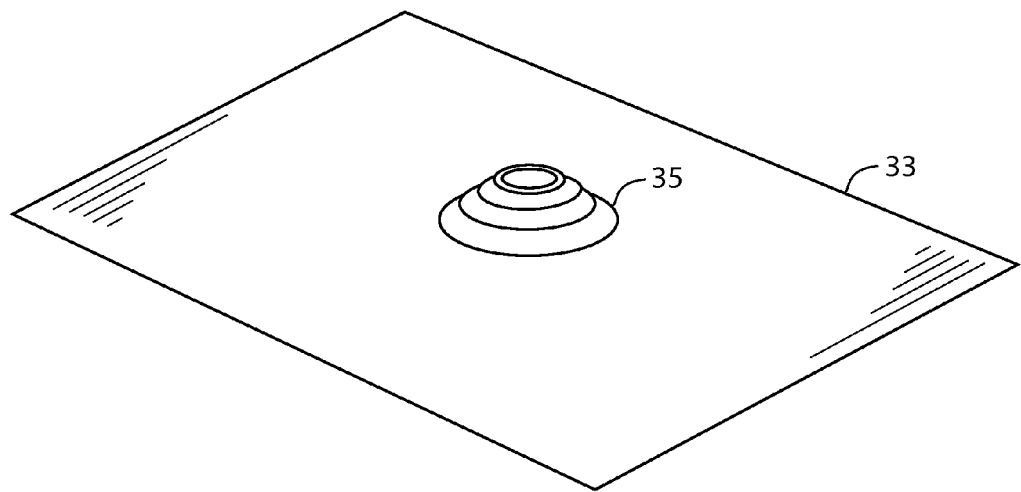
FIG. 8 shows flashing for preventing water infiltration from the stanchion.
Figure 9:
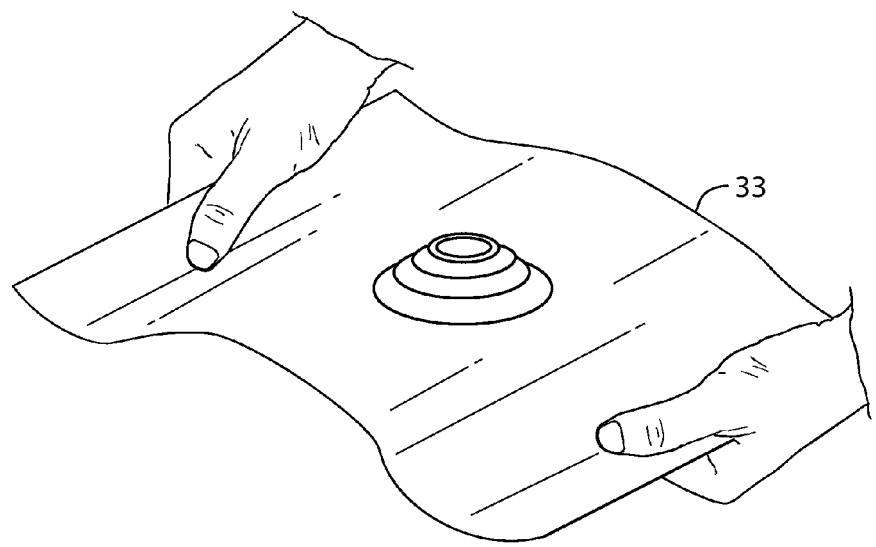
FIG. 9 shows hand forming the flashing to conform with the shape of the tile roof.
Figure 10:
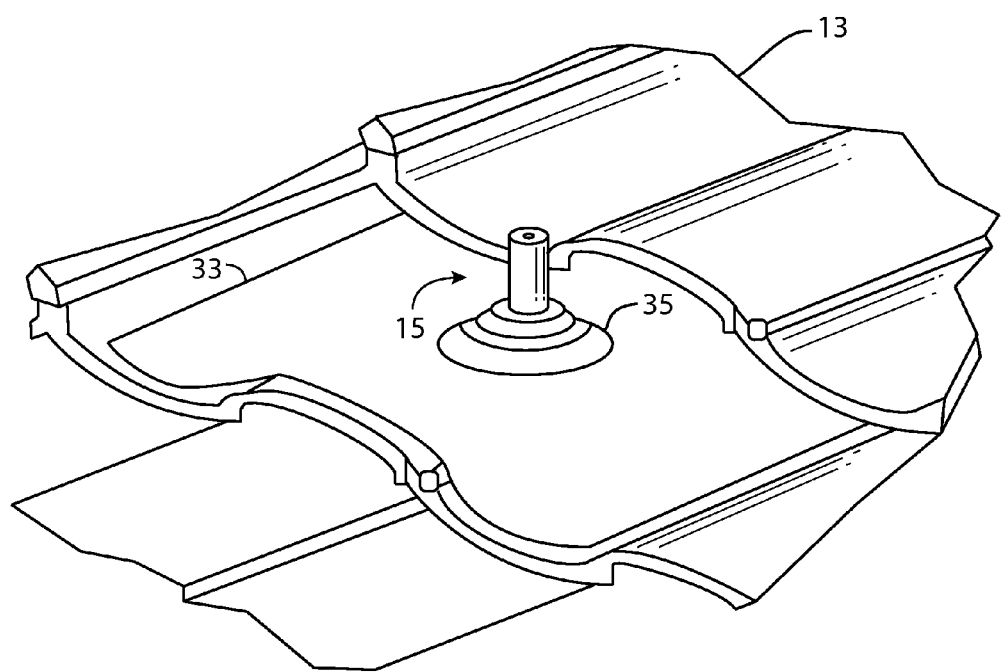
FIG. 10 shows the mounting device installed in the tile roof.
Figure 11:
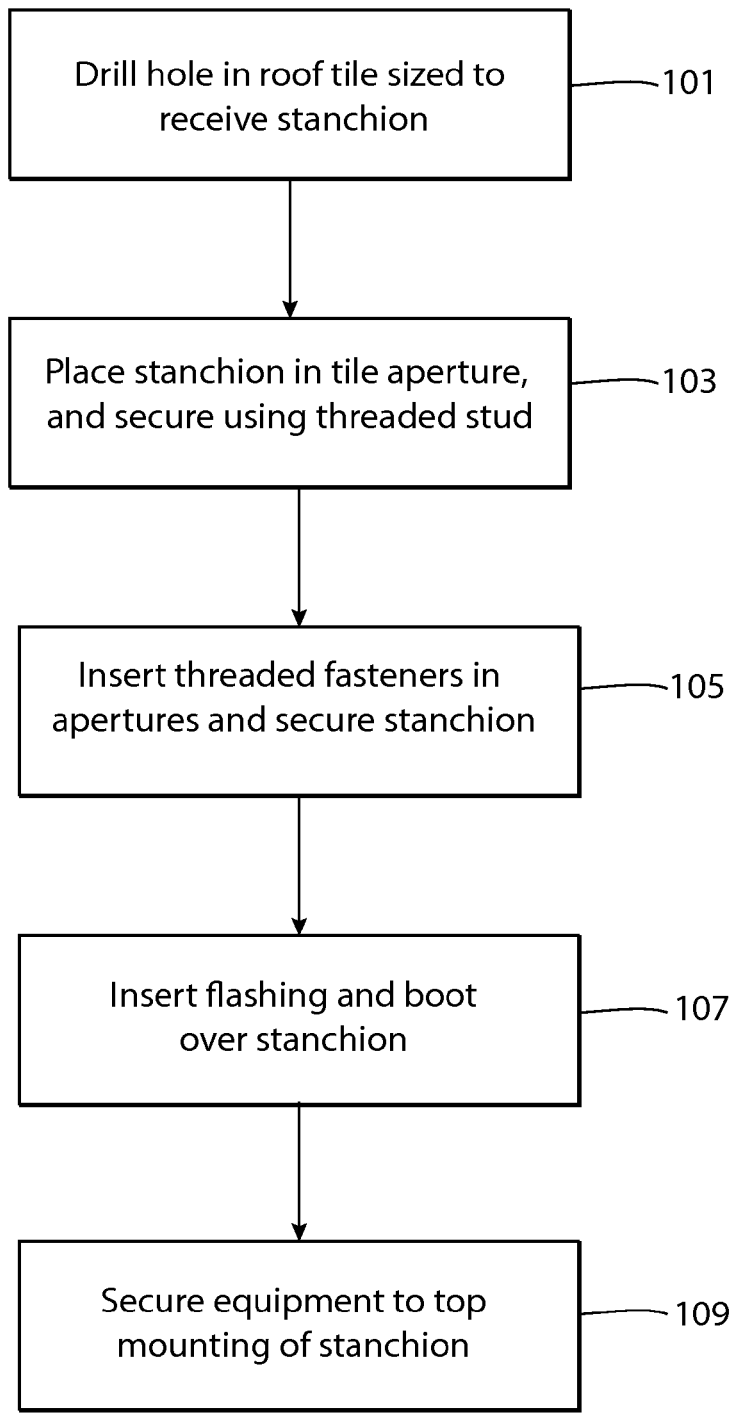
FIG. 11 shows a flow chart illustrating steps for assembling the mounting device to the roof.

FIGS. 5-10 illustrate how to secure the mounting device to the tile roof. FIG. 11 shows a flow chart illustrating steps for assembling the mounting device to the roof. FIG. 5 shows a portion of the tile roof 13 with flat roof tiles 53 with a jig 55 for drilling the tile aperture 29 in the tile roof 13 for mounting the stanchion 31 of FIG. 6. A drill 57 and tile-cutting bit 59 are attached to the jig 55. FIG. 6 shows the stanchion 31 and wood securing threaded stud 39 being inserted into the tile aperture 29 in the tile roof 13. FIG. 7 shows the wood securing fasteners 37 being inserted into the stanchion 31 after the stanchion 31 has been secured through the roof tile 25 to the roof-sheathing 23 of FIG. 3 by the wood securing threaded stud 39 of FIG. 6. FIG. 8 shows the formed-flashing 33 and integral elastomeric boot 35 before custom forming. FIG. 9 shows hand forming the formed-flashing 33 to conform to the shape of the roof tile 25 of FIG. 7. FIG. 10 shows the mounting device 15 installed in the tile roof 13.

Referring to FIG. 11 and FIG. 5 in step 101, a hole is drilled into the flat roof tile 53 to form the tile aperture 29. The tile aperture 29 is shown being drilled by the combination of jig 55, the drill 57, and tile-cutting bit 59. This is suggestive to the reader as one way of drilling a hole in tile. Creating a hole in tile is well known in the art. Those skilled in the art will readily recognize other ways to create a hole in tile according to their experience. The tile aperture 29 can be sized closely to the size diameter of the stanchion 31, if desired, to simplify water proofing, however there should be a small gap to allow for thermal expansion of the stanchion 31 and racking system of FIG. 7 as compared with the roof tile 25. As an example, for a stanchion 31 made out of 6061 or 7075 aluminum alloy, the coefficient of thermal expansion is approximately four time that of clay tile. For a stanchion 31 of 50 mm diameter, a gap of approximately 0.1 mm to 0.5 mm should be sufficient to allow for thermal expansion and contraction over outdoor temperature range of 80-degrees C. Those skilled in the art of installing will readily be able to calculate the necessary gap size, or recognize it by experience, without undue experimentation.

Referring to FIGS. 11 and 6, in step 103 the stanchion 31 is placed in the tile aperture 29 and secured to the roof-sheathing 23 of FIG. 3 by screwing the wood securing threaded stud 39 into the roof-sheathing 23. Alternatively, the wood securing threaded stud 39 can be screwed into the roof rafter 51 of FIG. 4. The stanchion 31 length should be chosen so that the first apertures 45 are above the roof tile 25 and the second apertures 47 are below the roof tile 25 when the stanchion 31 is secured to the roof-sheathing 23 of FIG. 3.

As shown in FIG. 1, typically the roof tiles 25 are set above the roof sheathing by lumber 61 or furring strips. For example, a 1×2 furring strips sets the height of the roof tile 25 approximately 0.75 inches (19.05 mm) above the roof-sheathing 23. In addition, barrel roof tile can typically have 3 inch (76.2 mm) base to peak height. This makes a total peak height including the furring strip of 3.75 inches (95.25 mm). Therefore, for a typical barrel tile roof installation, the second aperture 47 should be lower than 3.75 inches (95.2 mm) and the first aperture 45 should be higher than 3.75 inches (95.25 mm) measuring from bottom to top along the stanchion 31.

For a flat tile roof, for example, the tile roof 13 of FIG. 5, with a thickness of 0.625 inches (15.88 mm) and 1×2 furring strips with a height of 0.75 inches (19.05 mm), the second apertures 47 should be set no higher than 0.75 inches (19.05 mm) and the first aperture 45 should be set no lower than 0.75 inches (19.05 mm)+0.625 inches (15.88 mm)=1.375 inches (34.93 mm) from the bottom of the stanchion 31. A stanchion 31 that can accommodate both the flat tile roof type of this example and the barrel tile roof of the previous example can be constructed by placing the second aperture 47 lower than 0.75 inches (19.05 mm) and placing the first aperture 45 higher than 3.75 inches (95.25 mm) from bottom to top along the stanchion 31. The exact placement of the first aperture 45 and the second aperture 47 can be determined by the desired intersection point of the wood securing fasteners 37 with the roof-sheathing 23 of FIG. 3. It is anticipated that there may be a selection of different length stanchions available to accommodate a variety of tile types and mountings.

Referring to FIGS. 11 and 7, in step 105, with the stanchion 31 inserted through the roof tile 25, the wood securing fasteners 37 with elastomeric sleeves are inserted into the first apertures 45, and pass through the diagonal through-holes 43 and secured into the roof-sheathing 23 as shown in FIGS. 3-4.

Referring FIGS. 11 and 10, in step 107, the formed-flashing 33 with integral elastomeric boot 35 is placed over the stanchion 31 after it is installed. Referring to FIG. 3, the formed-flashing 33 and integral elastomeric boot 35 covers any gap between the stanchion 31 and tile aperture 29 as well as the heads of the wood securing fasteners 37 and the first apertures 45. The gap between the stanchion 31 and tile aperture 29 can also be filed with a flexible waterproof material such as silicon caulking. The formed-flashing 33 can be pre-formed for a specific tile type, but can also be formed on the job site, by hand forming, as shown in FIG. 9. Referring back to FIG. 10, the flashing is secured and sealed to the roof surface using flashing sealant and mastics known readily to those skilled in the art.

Referring to FIG. 11, in step 109, the solar panels 11 are secured to the mounting device 15 in combination with a rail 17, as in FIG. 1 or alternatively directly to the alternative mounting device 27 of FIG. 2, both as previously described.

FIGS. 12-16 shows the stanchion 31 in various views. FIG. 12 shows a perspective view of the stanchion 31 showing several of the first apertures 45 and the second apertures 47 as well as the first threaded aperture 49. FIG. 13 shows a side view of the stanchion 31 showing two of the first apertures 45 and the second apertures 47 with the diagonal through-holes 43 shown in broken lines to represent hidden lines. It should be understood that the diagonal through-holes 43 do not intersect, but rather cross either in front of or behind each other so that wood securing fasteners 37 of FIG. 3 can freely pass through. FIG. 14 shows a bottom view of the stanchion 31 a second threaded aperture 63 threaded and sized to receive and secure a machine threaded portion of the wood securing threaded stud 39 of FIG. 3 in the stanchion 31. Some method of fastening the wood screw to the stanchion may be pressed in or even cast in. FIG. 15 shows a top view of the stanchion 31 showing the first threaded aperture 49. FIG. 16 shows a sectional view of the stanchion 31 taken along section line 16-16 of FIG. 15. FIG. 16 shows the first threaded aperture 49, the second threaded aperture 63, some of the diagonal through-holes 43, and some of the first apertures 45 and the second aperture 47.

Figure 17:
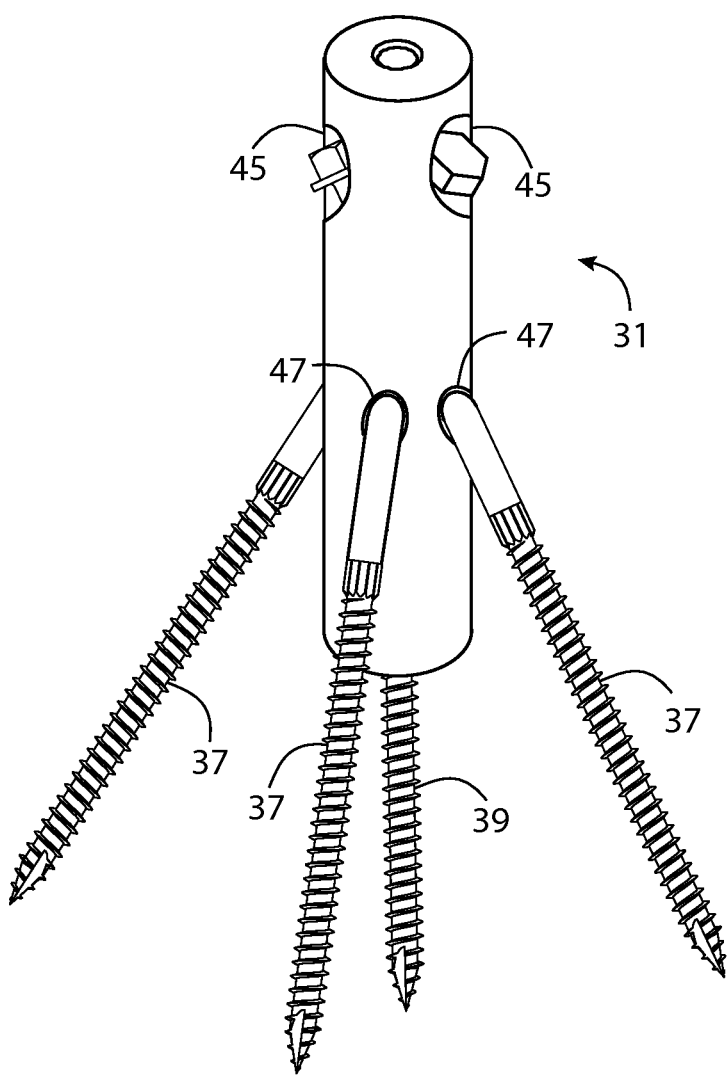
FIG. 17 shows a perspective view of the stanchion with the wood securing fasteners inserted.

FIG. 17 shows a perspective view of the stanchion 31 with the wood securing fasteners 37 inserted into the first apertures 45 and the wood securing portions passing through the second apertures 47. The wood securing threaded stud 39 is shown extending vertically below the bottom of the stanchion 31. The head of the wood securing fasteners 37 is seated in a recess around the first aperture 45.

The stanchion 31 of FIGS. 1-7, 10, and 12-17 can be made of metal, for example, steel, aluminum, or titanium. Alternatively it can be made out of thermal plastic. The stanchion 31 can be cast, extruded, rolled, forged, or in the case of thermal plastic, molded. Any material or fabrication process can be used that produces a stanchion 31 with sufficient strength to withstand the dynamic forces and weight of a solar panel racking system subject to an outdoor environment. The wood securing fasteners 37 can be any wood securing fastener appropriate for diagonal securing to the roof-sheathing 23 of FIG. 3. For example, structural wood screws such sold under the brand and series Simpson Strong-Tie SDS can be used.

Figure 20:
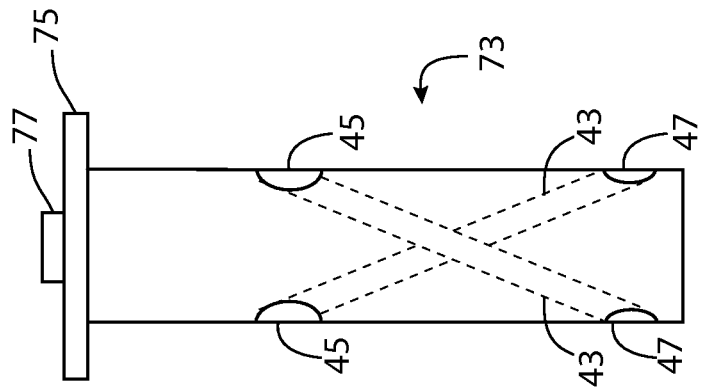
FIG. 20 shows a side view of the stanchion of FIG. 2.
Figure 19:
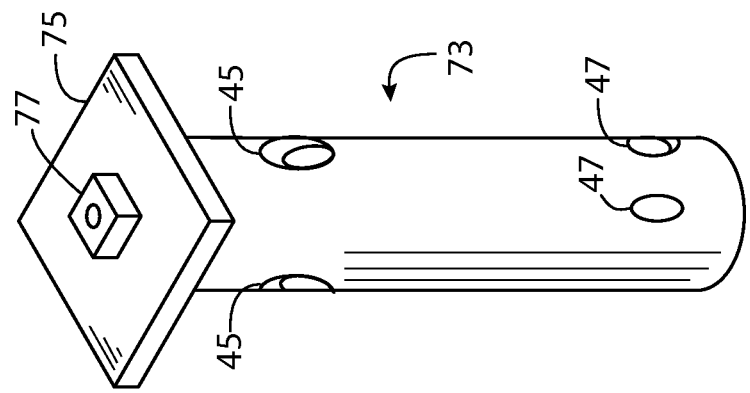
FIG. 19 shows a perspective view of the stanchion of FIG. 2.
Figure 18:
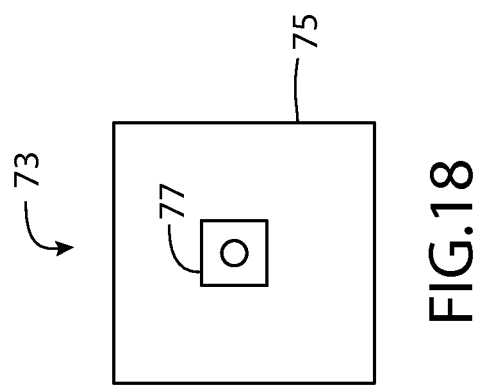
FIG. 18 shows a top view of the stanchion of FIG. 2.

FIGS. 18-20 show various views of an alternative stanchion 73 of the alternative mounting device 27 of FIG. 2. FIG. 18 shows a top view of the alternative stanchion 73 of FIG. 2. FIG. 19 shows a perspective view of an alternative stanchion 73 showing some of the first apertures 45 and the second apertures 47. FIG. 20 shows a side view of the alternative stanchion 73 also with the first apertures 45 and second apertures 47 in view. Referring to FIGS. 18-20, the alternative stanchion 73 includes a top planar base portion 75 with an alignment portion 77 projecting perpendicularly upward from the top planar base portion 75. The upward projection is square or rectangular in shape to seat the solar panels 11 of FIG. 2 in one of two orthogonal directions only. The diagonal through-holes 43 in FIG. 20, shown in broken lines, and their relationship to alternative stanchion 73 is the same as for the stanchion 31 previously described. The reader should note that the size and shape of the top planar base portion 75 as well as the position of the first apertures 45 must be configured such that there is clearance for the wood securing fasteners to readily inserted and removed from the alternative stanchion 73.

Figure 21:
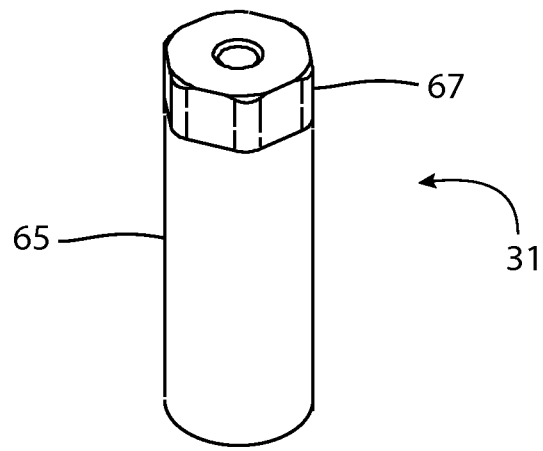
FIG. 21 shows a stanchion with a lower cylindrical portion and a hexagonal portion above the lower cylindrical portion.
Figure 22:
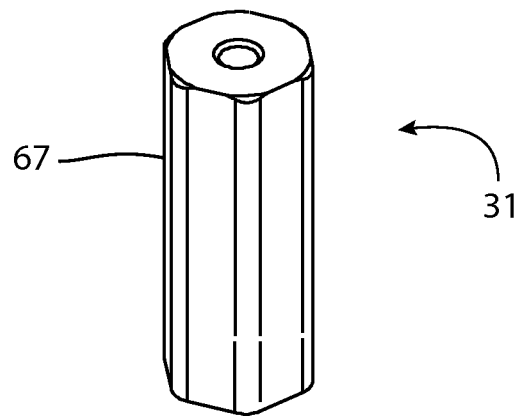
FIG. 22 shows the entire length of the stanchion as a hexagonal portion.

The stanchion 31 has been illustrated as a vertically projected solid and specifically as having a substantially right circle cylindrical shape. This shape was chosen because one skilled in the art can readily make the tile aperture 29 of FIG. 6 to accommodate a right circular cylindrical shape because of the right circular cylinder's circular cross section. For the purpose of this disclosure, a right cylinder is broadly defined to include right prisms, as well as right circular cylinders; a right prism being a right polygonal cylinder. The stanchions 31 of FIGS. 21-22 are modified right cylinders including either a polygon projected cross-section, as in FIG. 22, or a portion with a polygon projected cross-section and a circular projected cross-section as in FIG. 21. FIG. 21 shows a stanchion 31 with a lower right circular cylindrical portion 65 and a right hexagonal prism portion 67 above the lower right circular cylindrical portion 65. The right hexagonal prism portion 67 is so shaped in order to accommodate a wrench such as a socket wrench, box-end wrench, open-end wrench, or other tool for turning hexagonal shapes. FIG. 22 shows the entire length of the stanchion 31 as a right hexagonal prism portion 67.

Figure 23:
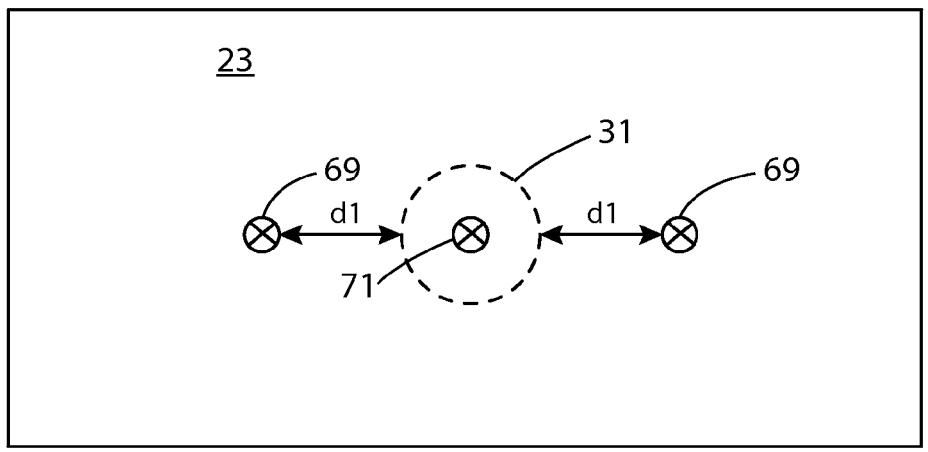
FIG. 23 shows a typical hole pattern representing the wood securing fastener contact point with the roof-sheathing for a stanchion designed for two evenly spaced wood securing fasteners.
Figure 24:
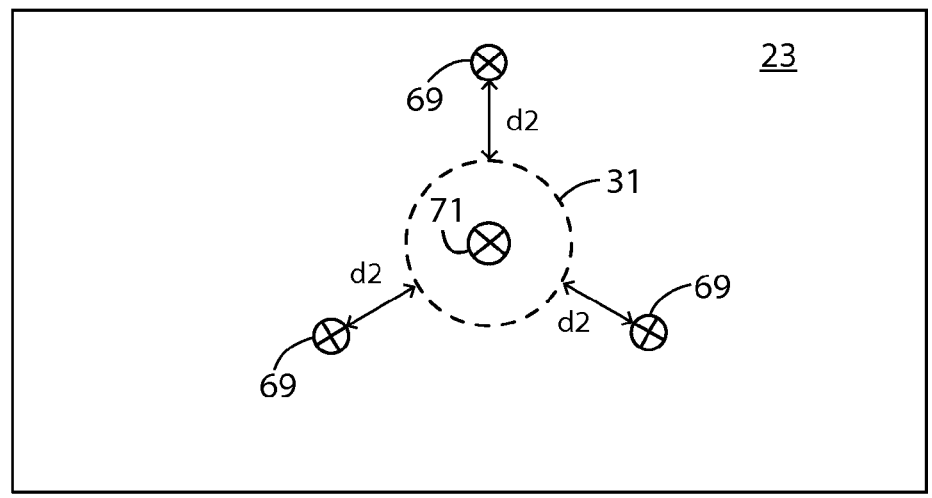
FIG. 24 shows a typical hole pattern representing the wood securing fastener contact point with the roof-sheathing for a stanchion designed for three evenly spaced wood securing fasteners.

The stanchion 31 described in FIG. 3 and others requires a minimum of two of the diagonal through-holes 43 in order to accommodate a minimum of two of the wood securing fasteners 37 along with the wood securing threaded stud 39. Three or more of the diagonal through-holes 43, approximately evenly spaced, allows for the possibility to secure the standoff against torqueing and shearing forces equally in all directions. FIGS. 23-24 represents a typical hole pattern representing the wood securing fastener contact point 69 and wood securing threaded stud contact point 71 with the roof-sheathing 23. The cross section of where the outside circumference of the stanchion 31 contacts the roof-sheathing 23 is shown by broken lines. In both FIGS. 23-24, the wood securing threaded stud contact point 71 is approximately centric with respect to the stanchion 31.

In FIG. 23, the stanchion 31 accommodates two fasteners spaced 180-degrees apart. The wood securing fastener contact point 69 is distance d1 from the outside edge of the stanchion 31. In FIG. 24, the stanchion 31 accommodates three fasteners evenly spaced, approximately 120-degrees apart. The wood securing fastener contact point 69 is distance d2 from the outside edge of the stanchion 31. Distances d1 and d2 are determined by the angle of the diagonal through-holes 43 and the distance of the second aperture 47, both shown in FIG. 3, from the bottom of the stanchion 31.

The mounting device 15 described for FIGS. 1-24 has been applied to tile roof structures. The mounting device 15 can be readily adapted to a metal roof structure as well. For example, in FIG. 1 or 2, if a metal roof were substituted for the tile roof 13, the mounting device 15 can be readily adapted to attach equipment to the metal roof. Instead of the tile aperture 29 in a roof tile 25, a similar aperture can be drilled into metal roof sheeting and the stanchion 31 can be mounted therethrough with the wood securing fasteners 37 and wood securing threaded stud 39 securing the stanchion 31 to the roof-sheathing 23 as shown in FIG. 3 for the tile roof. The formed flashing 33 and integral elastomeric boot 35 can be similarly mounted to the metal roof structure as previously described for FIG. 3 for the tile roof structure 10. In the case of metal roof structures where the wood roof sheathing is not used, appropriate fasteners can be substituted for the wood securing fasteners. For example, in the case of a metal roof, with metal sheathing, a metal roof securing fastener can be substituted for the wood securing fastener.

A device for mounting equipment, such as solar panels, to tile roof and similar structures has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A device for mounting equipment to a tile roof, the tile roof including a roof tile with a tile aperture therethrough, and a roof sheathing, the device comprising:
   two or more wood securing fasteners;
   a stanchion comprising a vertically projected solid piece of material including a first end, a second end, and a projected side portion, the projected side portion between the first end and the second end, the second end including a second end perimeter, the second end seated on a surface of the roof sheathing;
   the stanchion including two or more diagonal through-holes crossing each other, each of the two or more diagonal through-holes so positioned that when the stanchion is placed through the tile aperture, a corresponding wood securing fastener of the two or more wood securing fasteners is received and seated by one of the diagonal through holes of the two or more diagonal through-holes on the projected side portion of the stanchion above the roof tile and passes through the stanchion on an opposing portion of the projected side portion below the roof tile and intersects the surface of the roof sheathing outside the second end perimeter.

2. The device of claim 1, further comprising:
   a formable flashing member; and
   an elastomeric boot being integral with the formable flashing member, the elastomeric boot passing a top portion of the stanchion therethrough but covering each of the two or more wood securing fasteners.

3. The device of claim 1, further comprising a wood securing threaded stud extending vertically downward from a bottom surface of the stanchion.

4. The device of claim 1, wherein the stanchion is substantially shaped as a right circular cylinder.

5. The device of claim 1, wherein the stanchion is substantially shaped as a right hexagonal prism.

6. The device of claim 1, wherein an upper portion of the stanchion is substantially shaped as a right hexagonal prism and a lower portion of the stanchion is substantially shaped as a right circular cylinder.

7. The device of claim 1, wherein:
   the two or more diagonal through-holes are so positioned so that the two or more wood securing fasteners define approximately equidistant points of intersection on the surface of the roof sheathing with respect to a stanchion center.

8. The device of claim 1, wherein:
   the two or more diagonal through-holes are three diagonal through-holes including equidistant apertures around a circumference of the stanchion.

9. The device of claim 8, further comprising a wood securing threaded stud extending vertically downward from a bottom surface of the stanchion.

10. The device of claim 9, further comprising:
    a formable flashing member; and
    an elastomeric boot being integral with the formable flashing member, the elastomeric boot passing a top portion of the stanchion therethrough but covering each of the two or more wood securing fasteners.

* * * * *